United States Patent
Araya et al.

(10) Patent No.: US 6,455,826 B1
(45) Date of Patent: Sep. 24, 2002

(54) APPARATUS AND METHOD FOR CONTINUOUS MICROWAVE DRYING OF CERAMICS

(75) Inventors: Carlos R. Araya, Woodhull, NY (US); Ronald A. Boyko, Elmira, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/608,647

(22) Filed: Jun. 30, 2000

Related U.S. Application Data

(60) Provisional application No. 60/142,609, filed on Jul. 7, 1999.

(51) Int. Cl.[7] .............................. H05B 6/76; H05B 6/78
(52) U.S. Cl. ...................... 219/699; 219/700; 219/738; 219/756; 219/762; 34/259
(58) Field of Search ................................. 219/699, 698, 219/700, 701, 692, 738, 741, 744, 756, 762; 34/259, 264

(56) References Cited

U.S. PATENT DOCUMENTS

| | | | |
|---|---|---|---|
| 3,166,663 A | | 1/1965 | Fritz |
| 3,365,562 A | * | 1/1968 | Jeppson ............... 219/699 |
| 3,422,242 A | * | 1/1969 | Miyata ................ 219/699 |
| 3,858,022 A | | 12/1974 | Smith |
| 3,881,403 A | * | 5/1975 | Ingram et al. ......... 219/699 |
| 4,180,918 A | | 1/1980 | Ostrowski |
| 4,253,005 A | | 2/1981 | Gordon et al. |
| 4,728,531 A | | 3/1988 | Matz et al. |
| 4,857,245 A | | 8/1989 | Oshima et al. |
| 5,064,979 A | | 11/1991 | Jaeger |
| 5,191,183 A | | 3/1993 | Balbaa et al. |
| 5,406,058 A | | 4/1995 | Lipp |
| 5,510,601 A | | 4/1996 | Smith et al. |
| 5,521,360 A | | 5/1996 | Johnson et al. |
| 5,813,134 A | | 9/1998 | Min et al. |
| 6,066,290 A | | 5/2000 | Dennis et al. |

FOREIGN PATENT DOCUMENTS

| | | |
|---|---|---|
| CH | 561 398 | 4/1975 |
| DE | 1 465 043 | 4/1969 |
| DE | 35 38 899 | 5/1987 |
| EP | 0 145 822 | 6/1985 |
| EP | 0 483 468 | 5/1992 |
| FR | 2 223 931 | 10/1974 |
| FR | 2 522 798 | 9/1983 |
| FR | 2 651 874 | 3/1991 |
| GB | 1 502 262 | 3/1978 |
| GB | 2 156 640 | 10/1985 |

* cited by examiner

*Primary Examiner*—Philip H. Leung
(74) *Attorney, Agent, or Firm*—Anca C. Gheorghiu; Timothy M. Schaeberle

(57) ABSTRACT

The invention is directed at an apparatus capable of the continuous drying of ceramic articles which produces little or no microwave radiation emission. The drying apparatus comprises comprise a microwave-heating chamber, for heating a ceramic, having an entrance and an exit end and a material flow axis along which the ceramic articles are conveyed. Positioned adjacent the entrance and exit ends of the microwave-heating chamber, respectively, are a first and second attenuation chamber each having an entrance and an exit end. An inlet chamber, having a material flow path, is connected to the entrance end of the first attenuation chamber with a portion of the material flow path disposed at an angle to the flow axis. Connected to the exit end of the second attenuation chamber is an outlet chamber having a second material flow path; again at least a portion of the material flow path is at an angle to the material flow axis.

15 Claims, 4 Drawing Sheets

APPARATUS AND METHOD FOR CONTINUOUS MICROWAVE DRYING OF CERAMICS

This application claims the benefit of U.S. Provisional Application No. 60/142,609, filed Jul. 7, 1999, entitled "Apparatus and Method for Continuous Microwave Drying of Ceramics", by Araya et al.

BACKGROUND OF THE INVENTION

1. Field of the Invention

The invention relates to a method and apparatus for manufacturing ceramic materials. In particular, this invention relates to an essentially microwave emission-free apparatus and method for the continuous microwave heating and drying ceramics.

2. Discussion of the Related Art

Conventional heating or drying typically comprising convectional or a combination of convectional and radiative gas or electric resistance heating, is commonly used in the manufacturing of ceramic materials. However, the slow heating rate and poor temperature control associated with these conventional heating methods results in a high energy consumption and inconsistent product quality. Furthermore, utilization of these two modes of heating typically result in thermal differences within the ceramic body, due to the fact that these two heating modes are applied only to the surface and rely on thermal conductivity of the ceramic body to effect the temperature beneath the surface to the center of the piece.

Industrial heating by microwave radiation has been successfully used to accelerate the drying of traditional ceramics. In comparison with convectional heating, microwave heating provides a higher heating rate, where there is sufficient absorption, with better temperature control, and thus results in lower energy consumption and potentially better quality products. Furthermore, the utilization of microwave energy delivers a uniform application of the energy to the ceramic article, rather than to the article surface, as is the case for the aforementioned convectional and radiative modes of heating. Lastly, microwave heating is much faster than conventional drying because the ceramic body is heated directly through the interaction of the microwave energy with the ceramic body.

Although microwave heating is faster and more efficient than convectional and radiative heating, one disadvantage of microwave heating is the generation of microwave radiation emission. These microwave emissions must be controlled (i.e. shielded from the atmosphere) in order to comply with emissions regulations established by the relevant regulatory agencies (e.g., OSHA, FCC, CEPT). Ideally, any microwave dryer operation should be operated such that a nearly zero emission environment is maintained. Typically, the shielding of microwaves in microwave drying operations has been accomplished through the use of attenuation tunnels or water traps, and additionally the use of Aluminum curtains have been used to provide attenuation for any microwave emissions that escape past the attenuation tunnels. Although the use of attenuation tunnels, water traps and aluminum curtains provide sufficient shielding of microwave radiation emission, there are limitations on the both the size of the ceramic articles, as well as the overall load of ceramic articles, that can be dried. Furthermore, the use of attenuation tunnels, water traps and curtains, dictates that the drying operation be non-continuous, due to the fact that the drying cavity/chamber must be mechanically sealed off from the atmosphere during the drying of the ceramic articles and opened once the microwave drying is complete.

PCT Application WO 93/17449 discloses a continuous production method of forming ceramic green ware articles utilizing microwave setting (or accelerated drying) that incorporates a typical non-continuous drying operation. The drying step is accomplished by switching off the microwave and opening the doors of the microwave oven and moving pallets containing the ceramic articles into the microwave while moving out of the microwave pallets containing already dried ware and thereafter closing the doors of the microwave. This closing/sealing off and opening/shutting down of the microwave (i.e., non-continuous drying) is done in order to seal off the microwave from the atmosphere when the microwave is in operation and to allow the microwave to be opened when the microwaves are not being generated, thereby preventing the escape of any microwave radiation.

SUMMARY OF THE INVENTION

Accordingly it is an object of this invention to provide an apparatus for, and a method of, continuous microwave heating of ceramics that overcomes the shortcomings of aforementioned conventional microwave heating. Specifically, provided is an apparatus capable of the continuous drying of ceramic articles and which produces little or no microwave radiation emission.

The present invention thus provides an apparatus for microwave heating of a ceramic, comprising a microwave-heating chamber, for heating a ceramic, having an entrance and an exit end and a material flow axis along which the ceramic articles are conveyed. Positioned adjacent the entrance and exit ends of the microwave-heating chamber, respectively, are a first and second attenuation chamber each having an entrance and an exit end. An inlet chamber, having a material flow path, is connected to the entrance end of the first attenuation chamber with a portion of the material flow path disposed at an angle to the flow axis. Connected to the exit end of the second attenuation chamber is an outlet chamber having a second material flow path; again at least a portion of the material flow path is disposed at an angle to the material flow axis. Preferably, a gating mechanism separates each of the inlet and outlet chambers from the each of the first and second attenuation chambers, respectively; these gating mechanisms being provided for preventing the escape of microwave radiation emission. Lastly, the drying apparatus includes a transport system for transporting ceramic articles successively through the inlet and first attenuation chamber, microwave heating chamber and the second attenuation chamber and outlet chamber.

A second aspect of the invention involves a method for drying a ceramic material comprising placing a ceramic article on an air bearing support for supporting the ceramic article on a cushion of air. The supported ceramic article is then placed on the transport system (e.g., a conveyor) and caused to first pass the ceramic material successively through an inlet chamber and thereafter through a first attenuation chamber. The ceramic material then enters a microwave-heating chamber and is then subjected to a predetermined initial amount of heat energy by irradiating it with electromagnetic microwave radiation from an adjustable microwave power source. Thereafter, the ceramic material is caused to pass successively through a second attenuation chamber and lastly through an outlet chamber.

DETAILED DESCRIPTION OF THE INVENTION

Figure 1:
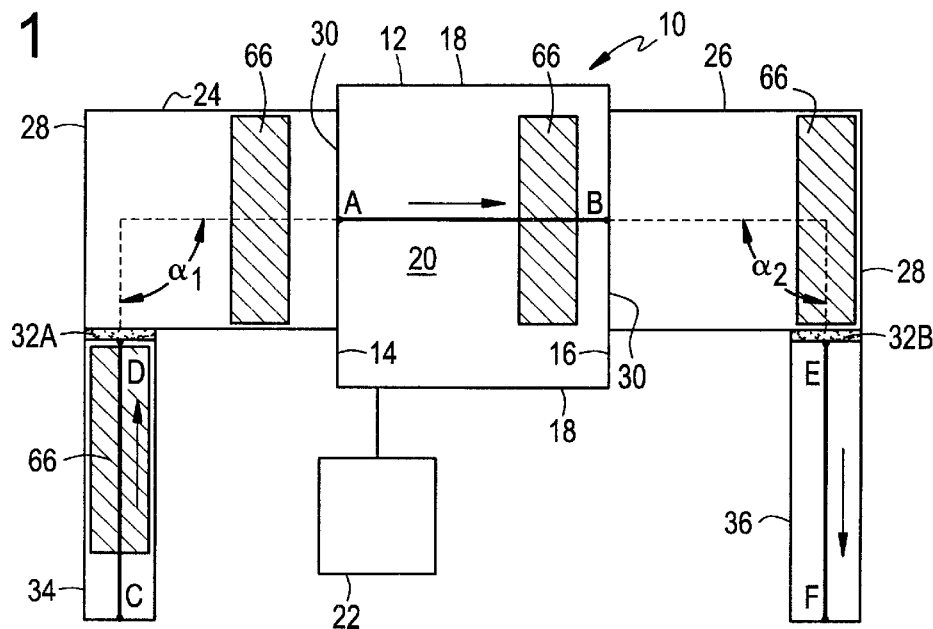
FIG. 1 is a schematic illustrating one embodiment of a drying apparatus invention described herein.

The present invention, a drying apparatus 10 for continuously drying ceramic material, illustrated in FIG. 1, comprises a microwave-heating chamber 10 wherein the ceramic material is subject to microwaves and subsequently dried. The microwave heating chamber 12 comprises an entrance region 14 and an exit region 16, and top 18 and side walls 20 formed from a microwave-impermeable, non-magnetic material that should preferably exhibit a high electrical conductivity and be resistant to oxidation at temperatures in the range of 200° C. Each of the top and side walls of the heating chamber are comprised of inner and outer shell, with a layer of insulation (e.g., fiberglass) disposed therebetween. The microwave-heating chamber configuration is such that a mass of ceramic 66 is capable of continuously passing though the inside of the heating chamber 12, as it is heated and dried, along the microwave chamber's material flow axis, line designated A-B. This flow axis approximates the direction of the flow of the ceramic material through the microwave heating chamber. In other words, the drying apparatus described herein is a continuous throughput microwave heating chamber.

A microwave source 22 for directing microwave power into the microwave-heating chamber is coupled to the microwave-heating chamber. Preferably, the microwave source 22 is an adjustable microwave generator or source, coupled directly or indirectly, to the microwave-heating chamber 12. Additionally, the apparatus may include a microwave power control system (not shown) for continuously controlling and adjusting the microwave power. This control system is described in greater detail in copending, co-assigned application, U.S. Pat. App. Ser. No. 60/142,610. Furthermore, the heating chamber is preferably multimodal, namely it will support a large number of resonant modes in a given frequency range, and in a more preferred embodiment, the heating chamber includes a mode stirrer to provide greater uniformity of electric field distribution within the microwave heating chamber.

Positioned adjacent each of the entrance 14 and exit ends 16 of the microwave heating chamber 12 are a first 24 and a second 26 attenuation chamber, respectively, with each of the attenuation chambers possessing an entrance 28 and an exit 30 end. In the embodiment shown, the first and second attenuation chambers 24, 26 are positioned so as to result in a straight-line extension of the microwave-heating chamber's 12 material flow axis, line A-B. It is contemplated that the each of the respective attenuation chambers could be positioned such they are angled with respect to the material flow axis.

These attenuation chambers are designed in a manner and are comprised of a material, so as to result in the minimization of the emission, i.e., the attenuation, of microwave energy from the microwave-heating chamber. Like the microwave-heating chamber, the attenuation chambers are comprised of an inner and outer shell of non-magnetic material with a layer of insulation disposed therebetween. Furthermore, the attenuation chambers are designed to withstand a maximum temperature of approximately 200° C. with an average heating rate of 25° C.

The attenuation chambers may include an attenuation device (not shown) comprised of material capable of absorbing microwave energy and thus heats up and dissipates the energy. In one embodiment this attenuation device comprises a water trap device, that simply comprises a continuous coiled hose that contains continually flowing water. An alternative embodiment of the water trap device comprises a continuous path of low loss material through which the water is capable of flowing, an example being Teflon® or similar type material block. In either of these alternative water trap embodiments the water may be made more efficient in its ability to absorb microwave energy through the addition of a soluble salt such as NaCl. Additionally, in either embodiment the recirculation of the water through a cooling loop is acceptable.

In another embodiment the attenuation device simply comprises portions of silicon carbide material disposed on the walls of the attenuation chamber.

Alternatively, the attenuation device comprises a spike trap attenuation device that comprises a plurality of non-magnetic material (e.g., aluminum) rods mounted on the walls of the attenuation chamber. The spike trap device functions to provide a tortuous reactive path to the microwave energy that functions to minimize the escape of the microwave energy.

In a preferred embodiment the each of the first and second attenuation chambers include both a spike trap and a water trap device with the spike trap device disclosed being adjacent the microwave heating chamber and the water trap device disposed adjacent the entrance and exit end of the attenuation chamber, respectively.

The drying apparatus 10 further includes an inlet chamber 34 having a material flow path, line designated C-D. The inlet chamber, and associated flow path, is connected to the entrance end of the first attenuation chamber 24 such that at least a portion of the flow path, C-D, is at an angle ($\alpha_1$) with respect to the aforementioned flow axis A-B; an angle of between 0 and 90°. Additionally, the drying apparatus includes an outlet chamber 36 having a second material flow path, line designated E-F. The outlet chamber, and associated second flow path, is connected to exit end of the second attenuation chamber 24. This outlet chamber, like the inlet chamber, is connected in such a manner that at least a portion of the second flow path, E-F is disposed at an angle ($\alpha_2$) with respect to the aforementioned flow axis A-B; again, an angle of between 0 and 90°. Preferably, the angles ($\alpha_1$ & $\alpha_2$) at which the inlet and outlet chambers' associated flow paths are, with respect to the flow axis, A-B, should be at least 45° and more preferably 90°. This configuration wherein at least a portion of the inlet and outlet chambers respective flow paths are at an angle with respect to the microwave heating chamber flow axis, A-B, functions to provide a more tortuous path for the escape of microwave radiation, when compared to standard microwave systems. In other words, as compared to those systems comprising inlet and outlet chambers regions wherein the entire flow path forms an angle of 0° and those systems that do not possess inlet and outlet chambers. By providing a first and second flow path with at least a portion both flow paths at angle with respect to the flow axis, along which the microwave energy must travel, the distance the microwave energy the must travel to reach the atmosphere is increased. Since electromagnetic energy decays with the square of the distance of energy travel, the result of this configuration is the minimization of the energy that escapes the drying apparatus.

Figure 2A:
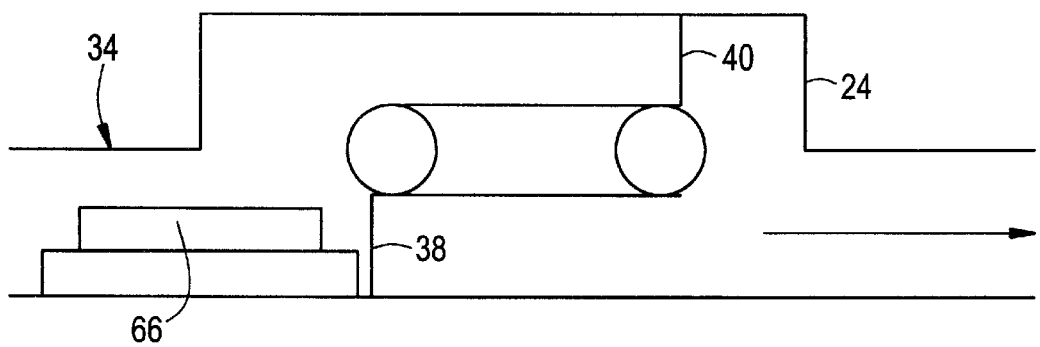
FIGS. 2a–2c illustrates the sequence of the gating mechanism of the drying apparatus described herein.
Figure 2B:
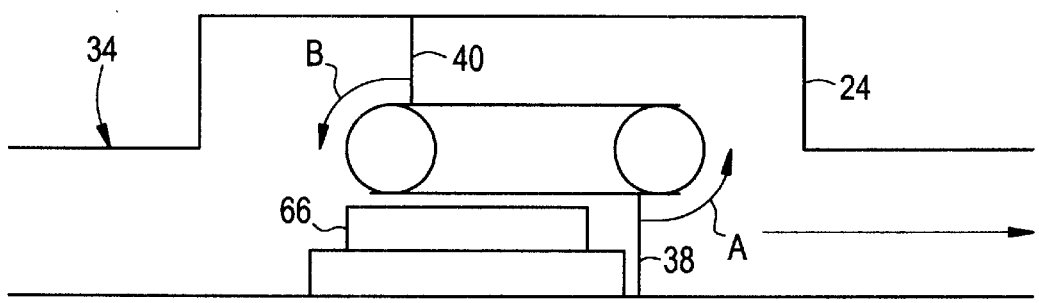
Figure 2C:
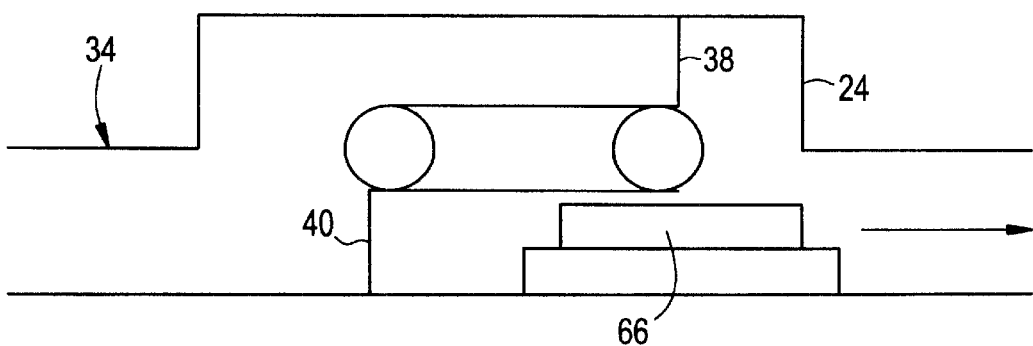

Preferably, the drying apparatus comprises a gating mechanism 32a, 32b, disposed between and separating each of the inlet and outlet chambers 34, 36 from each of the first and second attenuation chambers 24, 26, respectively. These gating mechanisms, like the inlet and outlet chambers possessing flow paths with a portion of their path angled with respect to the flow axis, also function to prevent the escape of microwave radiation emission as the ceramic material 66 enters or exits the attenuation chambers, 24 and 26. This gating mechanism is comprised of a pair of revolving gates, first gate 38 and second gate 40. FIGS. 2a–2c illustrate the functioning sequence of the gating mechanism. First gate 38 slides along the path of travel of the ceramic material 66 in the inlet chamber 34 until the ceramic material 66 passes through the gating mechanism and into the attenuation chamber 24 whereupon the first gate 38 rotates up and out of the way of the ceramic material path (arrow designation A) whereupon the second gate 40 rotates down and into the path of the ceramic material path (arrow designation B). These gates are comprised of a non-magnetic material and in a preferred embodiment, the first and second gates are comprised of flexible copper metal strips.

Figure 3:
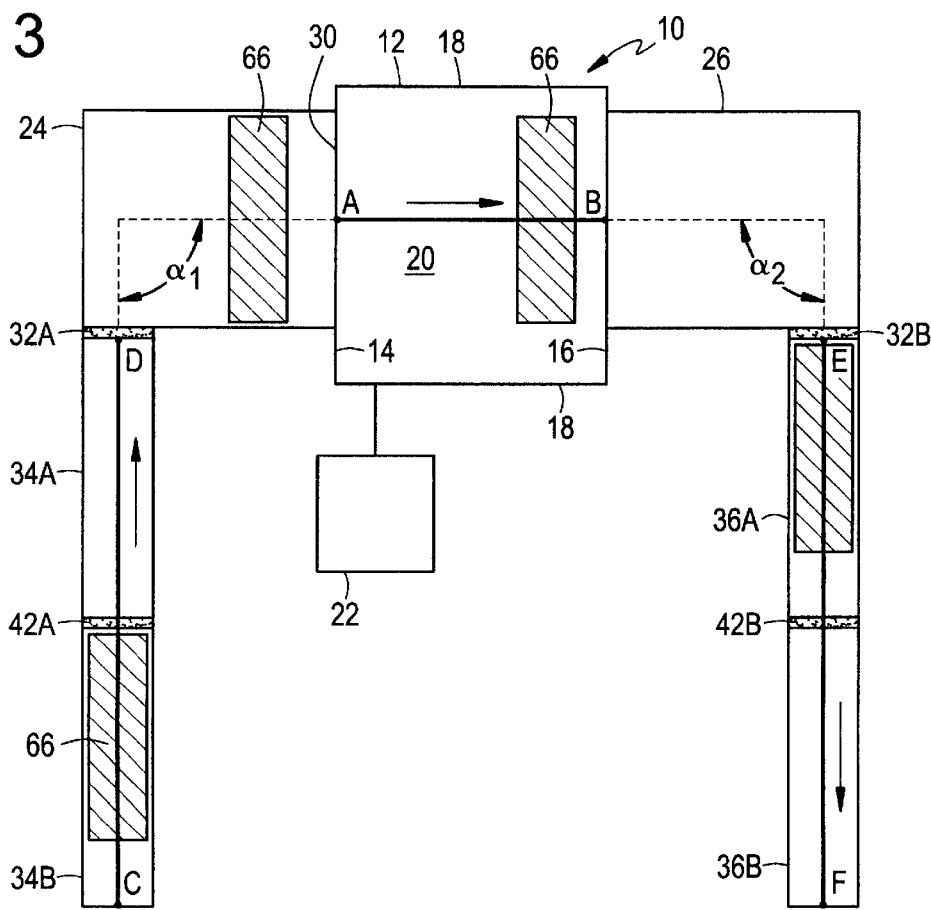
FIG. 3 is schematic illustrating a second embodiment of a drying apparatus invention described herein.

In a preferred embodiment, illustrated in FIG. 3, the drying apparatus 10 comprises the same heating chamber and first and second attenuation chamber configuration with the only additional feature being the incorporation of two successive inlet 34A, 34B and exit 36A, 36B chambers separated by additional gating mechanisms, 42A and 42B, respectively. Since the addition of an additional inlet and exit chambers and additional pair of gating mechanisms are the only differences from the FIG. 1 embodiment, like parts for FIG. 3 are identified with the same reference numerals used for the parts of the drying apparatus detailed in FIG. 1. A benefit of this embodiment is that the gates that may be utilized in this embodiment can comprise simple pneumatically, or in a preferred embodiment, servo or stepper controlled and operated, non-magnetic material (e.g. aluminum) gates that have an operating range between fully closed or open positions; e.g., fully up or down positions or fully left or right positions. In this embodiment the operation of the two gating mechanisms, 32A and 42A, 32B and 42B, for each of the entrance 34A, 34B and exit 36A, 36B regions alternate between their open/closed positioning; i.e., when one of the entrance gates is in a completely open position the other is completely closed. This ability to maintain alternate open-closed gates for each of the inlet/outlet chambers assures that the operation of the microwave is done so only under closed-door conditions. In other words, a near zero emission standard is maintained because during all microwave operating times, at least one door of the drying apparatus's entrance and exit is closed off thereby blocking any microwave radiation emission. It should be noted that the aforementioned gating mechanism 32A,B and 42A,B can be utilized in this embodiment.

Figure 4A:
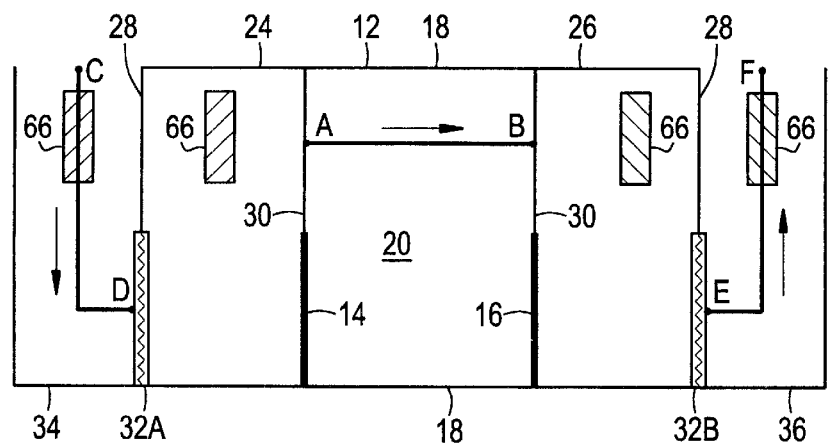
FIG. 4A is a schematic illustrating a modified embodiment of the drying apparatus invention of FIG. 1 described herein.

FIG. 4A illustrates a modified embodiment of the drying apparatus illustrated in FIG. 1 wherein each of the inlet and outlet chambers are positioned adjacent their respective first and second attenuation chambers; the added feature being that the inlet chamber-first attenuation chamber and the outlet chamber-second attenuation chamber each form a serpentine material flow path. Because of the serpentine configuration of these inlet/outlet chamber-attenuation combinations, it is not necessary for the inlet and the outlet chambers to be at the 90° angle with respect to the attenuation chamber, and material flow axis, as detailed in the aforementioned the FIG. 1 embodiment. The advantage of this embodiment is one of space efficiency, as it provides the equivalent microwave energy atmosphere escape minimization, as that for the embodiment of FIG. 1, though in a much more efficient manner space-wise. Like parts for FIG. 4A are identified with the same reference numerals used for the parts of the drying apparatus detailed in FIG. 1.

Figure 4B:
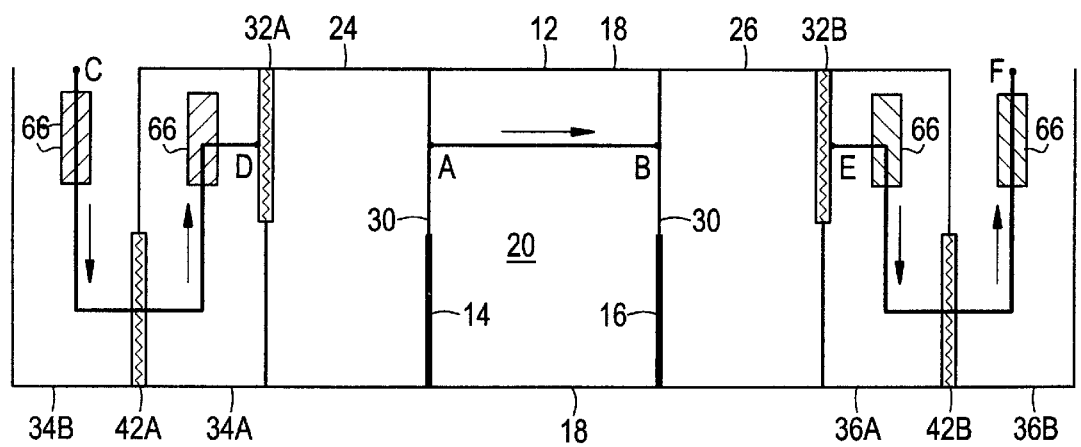
FIG. 4B is a schematic illustrating a modified embodiment of the drying apparatus invention of FIG. 3, described herein.

FIG. 4B illustrates a modified embodiment of the drying apparatus as illustrated in FIG. 3. In this embodiment the individual inlet and outlet chambers pairs are positioned adjacent their respective first and second attenuation chambers. Each of the inlet and outlet chamber pairs exhibit a serpentine material flow path. Like the previous embodiment of FIG. 4A, the advantage of this embodiment is one of space efficiency, as it provides the equivalent microwave energy atmosphere escape minimization as that for the embodiment of FIG. 3; again in a much more efficient manner space-wise. As before, like parts for FIG. 4B are identified with the same reference numerals used for the parts of the drying apparatus detailed in FIG. 3.

Figure 4C:
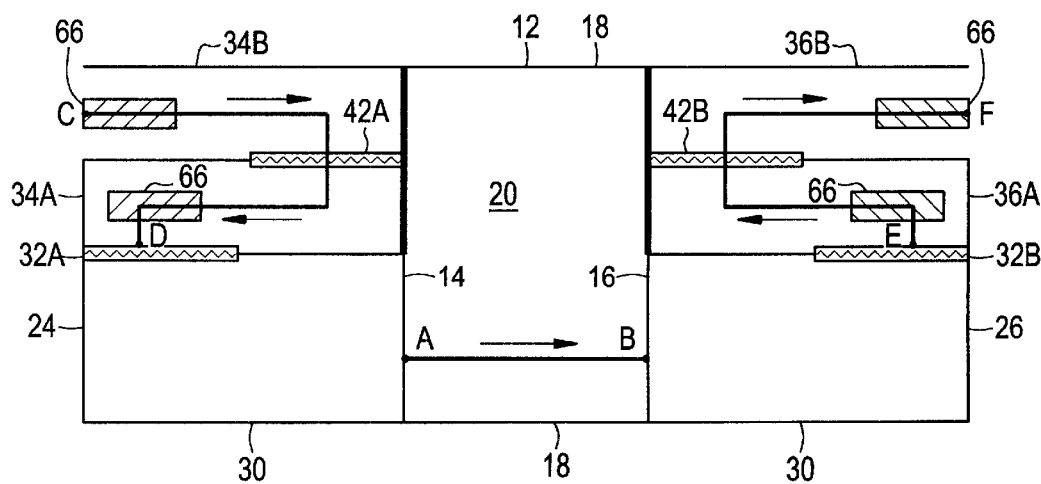
FIG. 4C is a schematic illustrating a third embodiment of a drying apparatus invention described herein.

FIG. 4C is a side view illustration of a drying apparatus embodiment and illustrates a modified embodiment of the drying apparatus as illustrated in FIG. 4B. Each of the inlet and outlet chamber pairs, respectively, are positioned adjacent their respective first and second attenuation chambers and are vertically stacked on top of each other and form a vertical serpentine path. Again, a more efficient design space-wise, while still providing the necessary microwave energy atmosphere escape minimization. Like parts for FIG. 4C are identified with the same reference numerals used for the parts of the drying apparatus detailed in FIG. 3.

Figure 5:
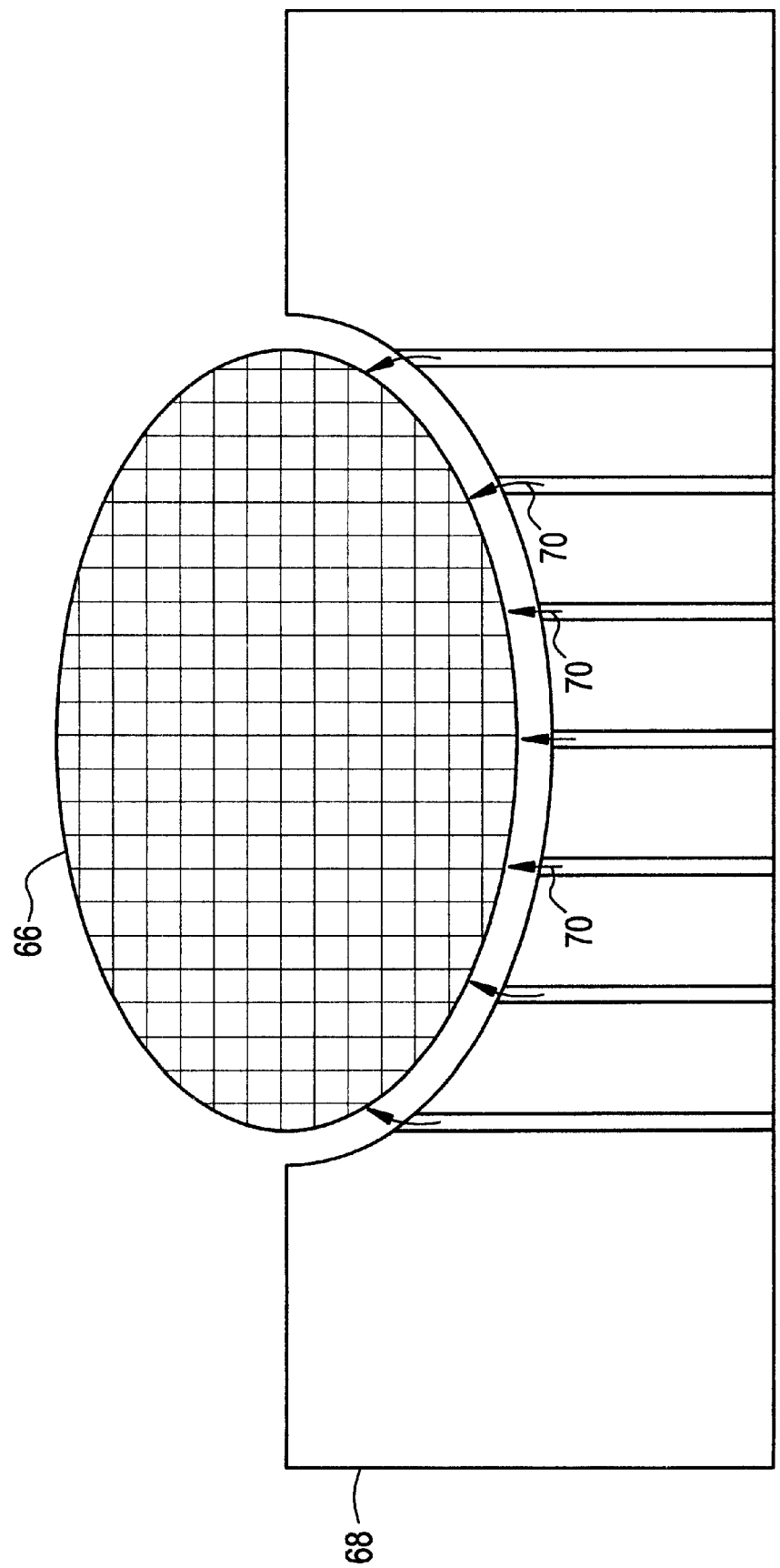
FIG. 5 is a sectional view of the air bearing contoured support used in the apparatus of FIGS. 1, 3 and 4A–C.

Each of the aforementioned embodiments further includes a transport system for transporting ceramic articles successively through each of the inlet chamber, first attenuation chamber, microwave heating chamber, second attenuation chamber and outlet chamber. This transport system comprises a conveyor means and a plurality of ceramic material supports that are conveyed through the drying apparatus by the conveyor means. Suitable conveyor means include belt and or chain driven conveyor means. A preferred material support comprises a plurality of air bearing contoured supports that are capable of supporting the ceramic material on an air cushion. FIG. 5 illustrates one embodiment air bearing contoured supports 68 wherein air is supplied to a underside of the support and is able to travel to through the support, via a series of delivery channels, so as to support the ceramic article; arrows designated 70 represent the air that provides the air cushion for the ceramic material.

The configuration utilizing inlet and outlet chambers having portions of their flow paths angled with respect to the flow axis, preferably separated from first and second attenuation chambers by non-magnetic material gating, functions to achieve a continuous drying apparatus that is capable of producing little or no microwave emission; i.e., a level below the allowable industrial limit of 10 mW/cm$_2$.

In a preferred embodiment of the invention, the optimum dimensions of the heating chamber 14 were found to be 65.5 in. wide by 51.5 in. high by 71 in. length. Aluminum sheets of a ⅛ in. thickness were chosen for the inner and outer shells of the microwave heating chamber 12 while fiberglass was chosen as the insulation material for disposition between the inner and outer shells. The preferred attenuation chamber dimensions were a total attenuation chamber exhibiting a length of 87.5 in (36 in. for the spike trap portion and 51.5 in. for the water trap portion), a width of 48 in., and a height of 51.5 in. The spike trap zone was comprised of 5 parallel rows of 25 spikes, each comprising 3/8 in. aluminum, rounded-end rods. The rods were mounted such that the center lines of the rods in each row are approximately 1.75" apart; the spike trap device as configured was approximately 12.5 top to bottom as mounted on the attenuation chamber wall.

The microwave source employed to generate the microwaves can comprise any conventional magnetron with an adjustable power feature. Preferably, the frequency of incident microwave used should be greater than about 1 GHz, more preferably the frequency used is between the range of between about 1 GHz and 2.45 GHz, which is the designated industrial band in the United States. In other countries, other wavelengths could be utilized from 100 to 10,000 MHz. Furthermore, the power of the incident microwave need be no greater than that sufficient to, as described above, raise the temperature of the ceramic article to a temperature effective for drying the ceramic article. Specifically, the microwave power source should possess variable power levels ranging between 1 to 75 kw, preferably between 10 and 50 kw. Magnetrons of this type can generate sufficient heat within the body to raise the temperature rapidly to the drying level e.g. up to about 150° C. in as little as 1 to 10 minutes.

In operation, the ceramic material is placed on the air bearing support and is supported by a cushion of air. The air bearing support supporting the ceramic article is then placed on the transport system (e.g., a conveyor) and caused to pass the ceramic material successively through the inlet chamber and thereafter through a first attenuation chamber. Thereafter, the ceramic material is passed through a microwave heating chamber and subjected to an predetermined initial amount of heat energy by irradiating it with electromagnetic microwave radiation from an adjustable microwave power source. The initial amount of heat energy being is defined as an amount of microwave radiation sufficient to raise the temperature of the ceramic article to a temperature effective for drying the ceramic article. Thereafter the ceramic material is passed successively through a second attenuation chamber and lastly through an outlet chamber.

In a preferred embodiment the drying operation in carried out in drying environment exhibiting a degree of humidity ranging from 0.1 to 100%; the benefit of utilizing this humidity-containing environment is the elimination of drying grooves that typically form on the surfaces of thin-wall ceramic bodies.

It is contemplated that the drying apparatus could be configured to include one or more additional microwave heating chambers adjacent the original microwave heating chamber 12 each having the same power output capability. The inclusion of additional microwave heating chambers allows for heating the ceramic articles with a "heating profile"; i.e., a fast heating chamber for fast setting of the ceramic articles' peripheral region or skin and thereafter normal, lower heating in the second microwave heating chamber or vice versa (slow/fast heating).

It is within the knowledge of one skilled in the art the amount of microwave radiation necessary to dry the article within a reasonable amount of time; i.e., a reasonable drying cycle for each ceramic body. Factors including the ceramic composition, geometry of the ceramic body, capabilities of the dryer should be considered in setting up the parameters of the drying process sufficient to achieve a reasonable drying cycle. For example, the drying cycle for a cylindrical thin-wall ceramic body exhibiting a length ranging from 9 to 36 in., a diameter of ranging from 3.0 to 7.0 in., possessing a cell well thickness of less than 4 mil and exhibiting a cell density ranging from 400 to 1600 cell/in$^2$ involves subjecting the body to microwave radiation delivered at an initial power of 50 kW, ranging between 35 and 60 kW, and frequency of 915 MHz. Preferably, the total drying time for these thin wall bodies is approximately 5 minutes or less The method described herein is particularly suitable for use in the drying thinwall ceramic bodies. Drying as used herein refers to a reduction in the liquid content of the body to a desired value, preferably, the drying is carried out to a degree where the ceramic article can be handled without causing any damage thereto or unacceptable deformation thereof. For example, ceramic articles of the thin wall cylindrical body type, a dried article, sufficiently dry for handling purposes, is a ceramic article having less than 5% of its original green state water, and preferably less than 1%.

While there is shown and described the present preferred embodiment of the invention, it is to be distinctly understood that this invention is not limited thereto but may be variously embodied to practice within the scope of the following claims.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. An apparatus for microwave heating of a ceramic, comprising:

a microwave heating chamber having an entrance and an exit and having a ceramic material flow axis along which the ceramic is heated;

a microwave source for directing microwave energy into the microwave heating chamber;

a first attenuation chamber positioned adjacent the entrance end of the microwave heating chamber and a second attenuation chamber positioned adjacent the exit end of the microwave heating;

an inlet chamber having a material flow path and positioned adjacent the first attenuation chamber, with at least a portion of the material flow path at an angle with respect to the flow axis;

an outlet chamber having a second material flow path positioned adjacent the second attenuation chamber, with at least a portion of the second material flow path at an angle with respect to the flow axis;

a transport system for transporting ceramic articles successively through each of the inlet chamber, first attenuation chamber, microwave heating chamber, second attenuation chamber and outlet chamber wherein the inlet and outlet chambers are provided other than for attenuation of microwave energy escaping from the microwave heating chamber.

2. The apparatus of claim 1 wherein the maximum power of the microwave source is greater than about 1 kW but less than about 75 kW and the frequency range of microwave energy to which the ceramic article is subject to is greater than about 1.0 GHz.

3. The apparatus in accordance to claim 1 wherein the first and second attenuation chambers include an attenuation device comprised of a material capable of absorbing microwave energy and dissipating the microwave energy.

4. The apparatus in accordance with claim 3 wherein attenuation device comprises either a water trap system or a spike trap system or a combination of both.

5. The apparatus in accordance with claim 4 wherein the spike trap attenuation device is positioned disposed adjacent the microwave heating chamber and the water trap attenuation device is positioned adjacent the inlet or outlet chamber, respectively.

6. The apparatus in accordance to claim 1 wherein at least a portion of the inlet and the outlet chambers material flow path is at an angle with respect to the flow axis, of greater than at least 45°.

7. The apparatus in accordance to claim 1 wherein at least a portion of the inlet and outlet chambers material flow path is at an angle with respect to the flow axis, of 90°.

8. The apparatus in accordance to claim 1 wherein the inlet and outlet chambers material flow path is of a serpentine shape.

9. The apparatus of claim 1 comprising a gating mechanism separating each of the inlet and outlet chambers from the each of the first and second attenuation chambers for preventing the escape of microwave radiation emission.

10. The apparatus in accordance to claim 9 wherein the gating mechanism comprises a pair of rotating gates comprised of a flexible copper material.

11. The apparatus in accordance to claim 9 wherein the rotating gates are comprised of aluminum.

12. The apparatus in accordance to claim 1 wherein the inlet and outlet chambers are each comprised of successive chambers positioned adjacent each other and separated by a gating mechanism comprising a gate capable of ranging through a fully open and closed positions and comprised of non-magnetic material.

13. The apparatus in accordance to claim 1 wherein the transport system comprises conveyor means and a plurality of air bearing contoured supports supported thereon for supporting the ceramic material on an air cushion.

14. The apparatus in accordance to claim 1 wherein the first and second attenuation unchambers have a material flow path with at least a portion of the material flow path at an angle with respect to the microwave chamber material flow axis.

15. The apparatus in accordance to claim 1 wherein the first and second attenuation chamber material flow path is of a serpentine shape.

* * * * *

UNITED STATES PATENT AND TRADEMARK OFFICE
CERTIFICATE OF CORRECTION

PATENT NO.    : 6,455,826 B1
DATED         : September 24, 2002
INVENTOR(S)   : Araya et al.

Page 1 of 1

It is certified that error appears in the above-identified patent and that said Letters Patent is hereby corrected as shown below:

Title page,
Item [54], "APPARATUS AND METHOD FOR CONTINUOUS MICROWAVE DRYING OF CERAMICS" should be -- APPARATUS FOR MICROWAVE DRYING OF CERAMICS --.

Column 10,
Line 18, "unchambers" should be -- chamber --.

Signed and Sealed this

Eighteenth Day of March, 2003

JAMES E. ROGAN
*Director of the United States Patent and Trademark Office*